April 29, 1969    S. W. McGEE ET AL    3,440,708
METHOD OF MAKING GRADATED FIBER METAL STRUCTURES
Filed Jan. 16, 1967
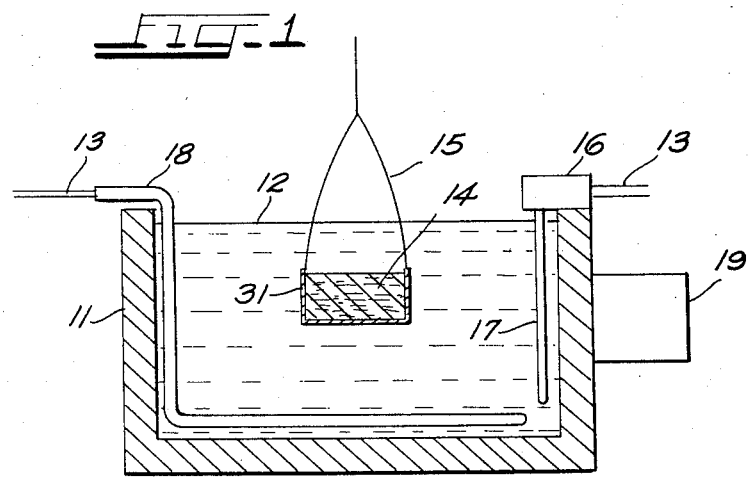
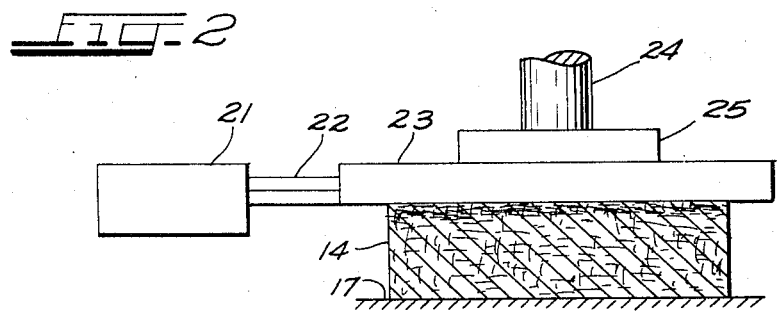
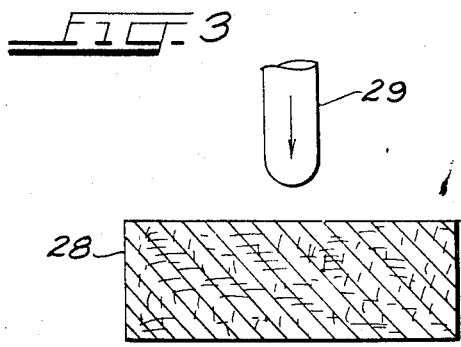
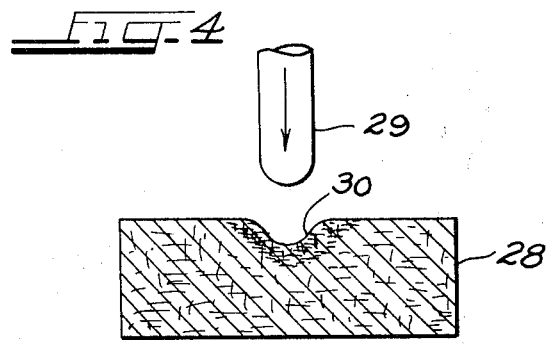
INVENTORS
SHERWOOD W. McGEE
MELVIN H. ZOISS
BY
James W. DeSimone
Their Att'y

United States Patent Office 3,440,708
Patented Apr. 29, 1969

3,440,708
METHOD OF MAKING GRADATED FIBER METAL STRUCTURES
Sherwood W. McGee, Lisle, and Melvin H. Zoiss, Chicago, Ill., assignors to IIT Research Institute, Chicago, Ill., a not-for-profit corporation of Illinois
Substituted for abandoned application Ser. No. 294,789, July 2, 1963. This application Jan. 16, 1967, Ser. No. 629,038
Int. Cl. B22f 7/00, 9/00
U.S. Cl. 29—419                                5 Claims

ABSTRACT OF THE DISCLOSURE

A process for forming fiber metal structures of gradated density by impregnating a fiber metal compact with a water soluble salt, solidifying the salt, hot forging the compact until the desired density gradient is obtained, removing the salt and impregnating the compact with a ceramic.

---

This case is a substitute for Ser. No. 294,789, filed July 2, 1963, now abandoned.

This invention is directed to the manufacture of porous metal structures and more particularly the manufacture of fiber metal structures of varying density.

Many structures require the use of one or two phase gradient compositions to meet the desired operational requirements. One such structure is a heat sink. Single phase heat sink materials may experience dynamic heating to such an extent that the thermal shock may be intolerable and the structure fails.

Two phase compositions as heat sinks will experience the same dynamic heating but can tolerate such heating to a greater degree than single phase structures. Two phase composites of uniform composition of each single phase, however, display no greater mechanical properties or tolerance to thermal shock than each single phase. On the other hand, a two phase gradient composition combines the advantages of metallic and non-metallic material in such a way as to produce a composition with a high degree of thermal shock tolerance. The gradient composition composites enjoy continuity of both phases—metal and non-metal—and can be engineered to specified thermal properties at different locations within the bodies while nevertheless maintaining adequate mechanical properties.

Accordingly, it is a principal object of this invention to provide a novel method of producing gradated fiber metal structures and the product resulting therefrom. Another object of this invention is to provide a multi-phase gradient composition having variable conductivity. Yet another more specific object of this invention is to provide an improved two phase gradient composition having variable specific heat. Yet still another more specific object of this invention is to provide a novel two phase gradient composition consisting of a fiber metal compact of varying density impregnated with a non-metallic material. A further more specific object of this invention is to provide a novel process for the production of two phase gradient structures wherein a fiber metal compact of varying density is formed while impregnated with a water soluble eutectic salt during fabrication and said salt is later removed and the compact impregnated with a ceramic material. A still further more specific object of this invention is to provide a novel process for the production of multi-phase fiber metal structures of varying density by hot forging to produce a compact of desired geometry. Yet a still further more specific object of this invention is to provide a novel process for the production of multi-phase fiber metal of varying density by impregnating a fiber metal compact with a water soluble salt, solidifying the salt, hot forging the compact until the desired density gradient is obtained, and removing the salt and impregniting the compact with a ceramic and the product resulting therefrom.

The foregoing and other objects will become more apparent from the detailed description to follow and the accompanying drawings in which:

FIGURE 1 is a schematic of a suitable system for the impregnation of a fiber metal compact in accordance with the teachings and practices of this invention;

FIGURE 2 illustrates a method for compressing the compact of FIGURE 2 to obtain a gradated compact; and FIGURES 3 and 4 depict an alternative method of obtaining gradated compositions of preferred shape.

This invention involves the use of fiber metal compacts. Briefly described such compacts consist of a porous mass of metal fibers of short length and small cross section. For a more detailed description thereof and to one method of fabrication reference is made to copending application Ser. No. 425,109, now Patent No. 3,310,389, entitled "Brake Lining Materials and Articles Made Therefrom" assigned to the present assignee—IIT Research Institute.

Referring now to FIGURE 1, a homogenous fiber metal compact 14 is shown. In order to effectively compress or hot forge compact 14 we have discovered that it is necessary to impregnate the compact with a eutectic mixture of potassium nitrate and sodium nitrite—

($KNO_3$+$NaNO_2$, 50–50 molecular weight mixture)

To accomplish impregnation, a system such as that illustrated in FIGURE 1 was devised. Compact 14 is immersed in a suitable vessel 11 containing the melted salt 12. A eutectic mixture of potassium nitrate and sodium nitrite melt at approximately 300° F. Heater 18 is immersed in vessel 11 to maintain solution 12 above the melt temperature of the salt. In addition, thermocouple 17 may be used with a conventional temperature regulator 16 to control heater 18 via leads 13.

Actually other water soluble salts may be used in the process, however, a eutectic mixture is preferred. The eutectic mixture is preferred because it offers advantages over other salts. For example, in a simple single ectectoid system the eutectic mixture is the lowest melting combination of the ingredients. By virtue of its low melting point, possible oxidation of the metal fibers is minimized during impregnation. Upon cooling, the eutectic mixture passes from the liquid phase to the solid phase instantaneously. It is believed that this rapid transfer from the liquid to solid phase minimizes the total stress experienced by the fiber structure as a result of solidification.

We have found that it is preferable to vibrate the solution to insure complete impregnation of compact 14, and thus remove any trapped air in the compact. To accomplish this, vibrator 19 is mounted on the side of vessel 11 and when air bubbles are no longer observed emitting from compact 14, it can be assumed that impregnation is complete. The impregnated compact 14 is cooled to room temperature at which the salt is solid. Compact 14 is then ready for hot forging. Compact 14 can be enclosed in container 31 so that upon removal, the liquid salt will not drain off before solidification. In certain cases container 31 may be omitted due to the high capillary attractive forces that compact 14 exhibits.

Refering to FIGURE 2, if compact 14 is compressed by heated plate 23, the salt immediately in front of plate 23 melts allowing the fibers in the liquid salt region to be compressed. By selecting the proper temperature, the depth of melting on the surface of compact 14 may be regulated. That is to say, as the temperature of plate 23 is increased, the melting zone of the salt increases. At the same time, the unmelted salt rigidly holds the surrounding fibers in place so that their density remains fixed.

Plate 23 is heated and temperature controlled by regulator 21 which may be of the conventional type. Regulator 21 controls the amount of power to plate 23 via leads 22. Plate 23 compresses compact 14 as it rests on base 27 by means of a conventional press coupling power thereto through shaft 24 and block 25.

FIGURES 3 and 4 illustrate an alternative method of preparing an appropriately shaped gradated compact. Compact 28 consisting of fiber metal impregnated with a water soluble salt that is solid at about room temperature, is subjected to heat and compression by an appropriately shaped mandrel 29. Similarly, as before, when heated mandrel 29 comes into contact with the salt filled compact 28, the salt immediately in front of mandrel 29 melts allowing the fibers in the liquified salt to compress and densify. The depth of melting is directly proportional to the temperature of mandrel 29. For example, with mandrel temperatures ranging from 500 to 600° F., a fiber metal compact impregnated with the aforementioned potassium nitrate and sodium nitrite salt exhibited a melt zone of ⅛ inch. Applied pressures of from 100 to 1,000 p.s.i. were used. Of course, the temperature of mandrel 29 (or plate 23) as well as the pressure applied thereby will vary with various embodiments depending on the desired results as will occur to those skilled in this art. Additionally, the time of application of the heated mandrel affects on the depth of melting. Here too, as in the case with temperature and pressure, the parameters will vary pending on the desired results. For example, the thermal conductivity of the fiber composition will affect the melt zone.

Once the appropriate metal concentration gradient is obtained in the region 30 of compact 28, the salt filled fiber metal body can then be machined to final shape very easily as the salt rigidly holds each fiber in place. Such rigid holding insures that fiber-to-fiber spacing remains constant during machining since no fiber deflection can occur when the cutting tool experiences a fiber.

After machining, compact 28 can be quickly leached out, leaving a fiber metal skeleton into which a ceramic or plastic material can be introduced. An important advantage of our process is that the salt used is water soluble. Accordingly, leaching is carried out with water.

The resulting composite can then be sintered to full consolidation with the established phase-to-phase and fiber-to-fiber bonding. By sintering, a bond is established between the aggregation of fibers to form an integral unit. Sintering may be accomplished by several techniques which are well known to those skilled in this art. For example, a homogenous mechanically interlocked network of stainless steel fibers was sintered by simply exposing the fiber structure to a temperature of 2400° F. in a suitable atmosphere.

Alternatively, the ceramic or impregnated gradated compact may be hot pressed. By hot pressing, there is densification of the compact at a temperature which the materials being pressed are in the plastic stage. In other words, sintering is performed with the mechanical application of pressure at an elevated temperature. Hot pressing is usually for the densification of porous powder compacts to ensure the absence of voids or porosity. In this case, hot pressing was applied with a fiber metal network impregnated with a ceramic powder. The metal fibers were, of course, at full density—the ceramic phase was not. Accordingly, the compact was hot pressed to fully densify the ceramic phase.

The gradated compact may be ceramically impregnated by the well-known technique of slip casting. Briefly, such technique involves the suspension of ceramic powder into a fluid vehicle (i.e., water or glycerine) to form a slurry, which slurry is passed through the compact permitting the powders to come to rest within the pores of the compact. Compact 14 may be placed in a porous mold so that the ceramic powders are not passed but the fluid vehicle is passed. In addition, vibration or vacuum may be employed to draw off the water. After this technique of impregnation the compact may be hot pressed as previously described. While slip casting has been referred to as one successful method for impregnating, it will be obvious to those skilled in the art that other methods will successfully accomplish the same result.

A series of separate specimens of from 20–50% density of molybdenum skeletons impregnated with ceramic ($Al_2O_3$ or BeO) were prepared to confirm the theoretical results. These specimens were in the shape of rods 4 inches long and 0.5 inch in diameter. The rods were severely quenched by immersing one-half of their lengths in water or sodium hydroxide at room temperature after first heating the rods up to about 2572° F. These specimens did not break down under the severe thermal shock experienced. Other gradient composite metal-ceramic specimens were tested in a heated pebble bed air tunnel. These specimens were almost instantaneously exposed to an air temperature at 3600° F. and a velocity of about Mach IV without any resulting cracks. Very little erosion was witnessed on the specimens even when tested somewhat longer than would be expected.

It appears necessary to have gradient multi-phase composites of both phases in order to survive extreme thermal shock and erosion while maintaining satisfactory mechanical properties in many environments. In addition, it may be necessary, depending upon the application, to design or tailor make the thermal properties of the composite at different locations thereof. This invention accomplishes the foregoing requirements satisfactorily.

From the foregoing it will be appreciated that we have provided a novel process and product offering considerable versatility over the prior art. Some of the advantages of our process are that the thermal conductivity of the structure is controllable. The specific heat may be regulated by the amount of ceramic concentration. The emissivity of the surface is controllable. The erosion performance of the surface is controllable; that is, if required, the immediate surface may be all ceramic with the transition to the ceramic immediately following. This results in great erosion and oxidation resistance. The thermal shock resistance of the bond between the metal fiber and the non-metallic impregnation is very adequate.

In conclusion, it is emphasized that thermal shock and erosion resistance are but two salient advantages resulting from this invention. Other advantages, to name a few, are control of: compact mass, compact bearing qualities, compact resistivity and resistance to stress and strain. Additionally, while a good deal of the disclosure, is with reference to multi-phase gradated fiber metal structures, single phase compacts are also useful. In other words, compact 14 may be gradated by the disclosed method, leached and machined, but not impregnated with another material. For example, such single phase gradated compacts have utility as filters, sound absorbers and boundary layer controls.

Obviously, modifications will occur without departing from the novel scope and concepts of this invention.

We claim as our invention:

1. The method of fabricating gradated fiber metal structures comprising the steps of:
   impregnating a fiber metal skeleton with a water soluble eutectic salt that is solid at about room temperature;
   solidifying the impregnated salt;
   hot forging the impregnated skeleton while said salt is in a solid state to compress the structure to the desired density gradient;
   removing said salt by rinsing in water; and
   impregnating said structure with a ceramic material.

2. The method of fabricating gradated fiber metal structures comprising the steps of:

impregnating a fiber metal skeleton with a water soluble eutectic salt that is solid at about room temperature;
solidifying the impregnated salt;
hot forging the impregnated skeleton while said salt is in a solid state to compress the structure and vary its density;
removing said salt by rinsing in water;
impregnating said structure with a ceramic material; and
sintering said structure.

3. The method of fabricating gradated fiber metal structures comprising the steps of:
impregnating a fiber metal skeleton with a water soluble eutectic salt that is solid at about room temperature;
solidifying the impregnated salt;
hot forging the impregnated skeleton while said salt is in a solid state to compress the structure and vary its density;
removing said salt by rinsing in water;
impregnating said structure with a ceramic material; and
hot pressing said structure.

4. The method of making a gradated fiber metal member which comprises the steps of:
impregnating a substantially uniform fiber metal skeleton with a molten water soluble salt that is solid at room temperature;
cooling said molten salt to solidify in the interstices of said fiber metal skeleton;
hot forging said impregnated fiber metal skeleton to the desired density gradient while said salt is in the solid state in said skeleton except where such hot forging selectively melts such salt; and
rinsing said salt out of said skeleton with water.

5. The method as defined in claim 4 wherein said gradated fiber metal skeleton resulting following removal of the salt therefrom is subsequently impregnated with a material selected from the group consisting of ceramics and plastics.

References Cited

UNITED STATES PATENTS

| 3,138,856 | 6/1964 | Kuchek | 29—423 |
| 3,218,684 | 11/1965 | Spink | 29—423 X |
| 3,233,985 | 2/1966 | Kraft et al. | 29—420 X |
| 3,310,387 | 3/1967 | Sump et al. | 29—182.5 |

JOHN F. CAMPBELL, *Primary Examiner.*

D. C. REILEY, *Assistant Examiner.*

U.S. Cl. X.R.

29—163.5, 424